US006575606B2

(12) United States Patent
Shaw (10) Patent No.: US 6,575,606 B2
(45) Date of Patent: Jun. 10, 2003

(54) LIGHT SOURCE MOUNTING APPARATUS FOR LIQUID CRYSTAL PROJECTOR

(75) Inventor: Cheng-Ta Shaw, Changhua Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/893,884

(22) Filed: Jun. 29, 2001

(65) Prior Publication Data

US 2002/0136016 A1 Sep. 26, 2002

(30) Foreign Application Priority Data

Mar. 22, 2001 (TW) ........................................ 90106675 A (51) Int. Cl.[7] .............................................. H01B 25/14
(52) U.S. Cl. ........................ 362/433; 362/306; 362/288; 362/274; 362/372; 362/549
(58) Field of Search ................................. 362/549, 372, 362/362, 306, 288, 274, 369, 390, 433

(56) References Cited

U.S. PATENT DOCUMENTS 6,082,878 A * 4/2000 Doubeck et al. ............ 362/365

\* cited by examiner

Primary Examiner—Sandra O'Shea
Assistant Examiner—Anabel Ton
(74) Attorney, Agent, or Firm—Birch, Stewart, Kolasch & Birch, LLP (57) ABSTRACT

A light source mounting apparatus for liquid crystal projector comprises a lamp base (for holding the light generator) and a casing (for shielding light scattering). The lamp base has a board shape holding unit. The casing has a front positioning plane and a strip spring located above the front positioning plane. When the lamp base and casing is reassembled, the holding unit forces the light generator mounted thereon contact tightly the front positioning plane to rapidly complete initial positioning, and the rear end of the strip spring engages the light generator securely for pressing the light generator against the front reference plane tightly without flipping thereby to attain accurate positioning quickly.

13 Claims, 9 Drawing Sheets

LIGHT SOURCE MOUNTING APPARATUS FOR LIQUID CRYSTAL PROJECTOR

FIELD OF THE INVENTION

This invention relates to a light source mounting apparatus for use in liquid crystal projector.

BACKGROUND OF THE INVENTION

Figure 1:
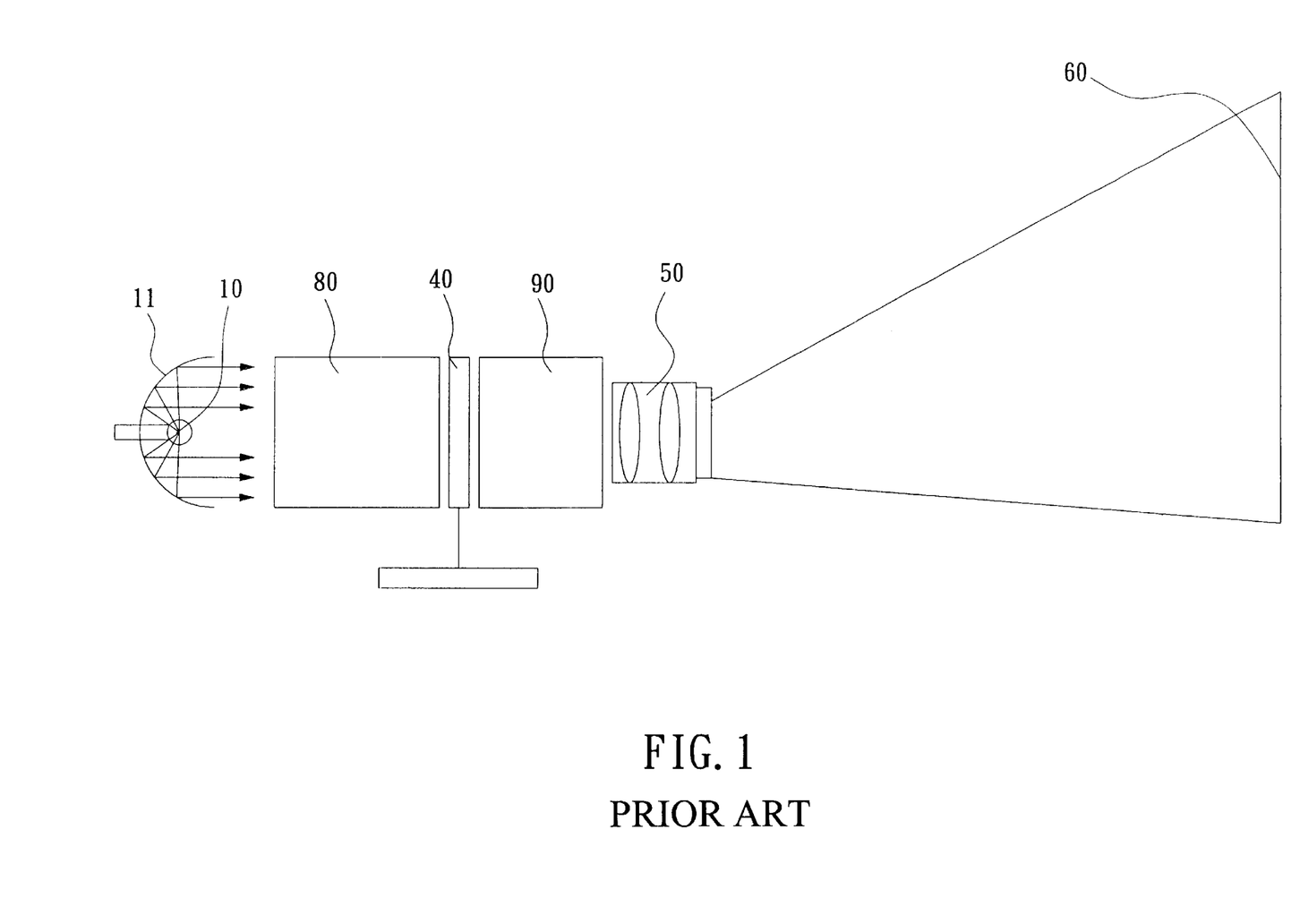
FIG. 1 is a schematic view of a liquid crystal projector.

Liquid crystal projector is an image displaying technique well known in the art. Its general operation principle is illustrated in FIG. 1. A light generator 10 has a lamp located in a reflector 11 (which contains a parabolic reflection mirror) to generate reflecting parallel light rays passing through a illumination system 80, a liquid crystal display panel 40 and a recombination system 90, and a lens 50 to project the original image from the liquid crystal display panel 40 to a front screen 60.

Figure 2:
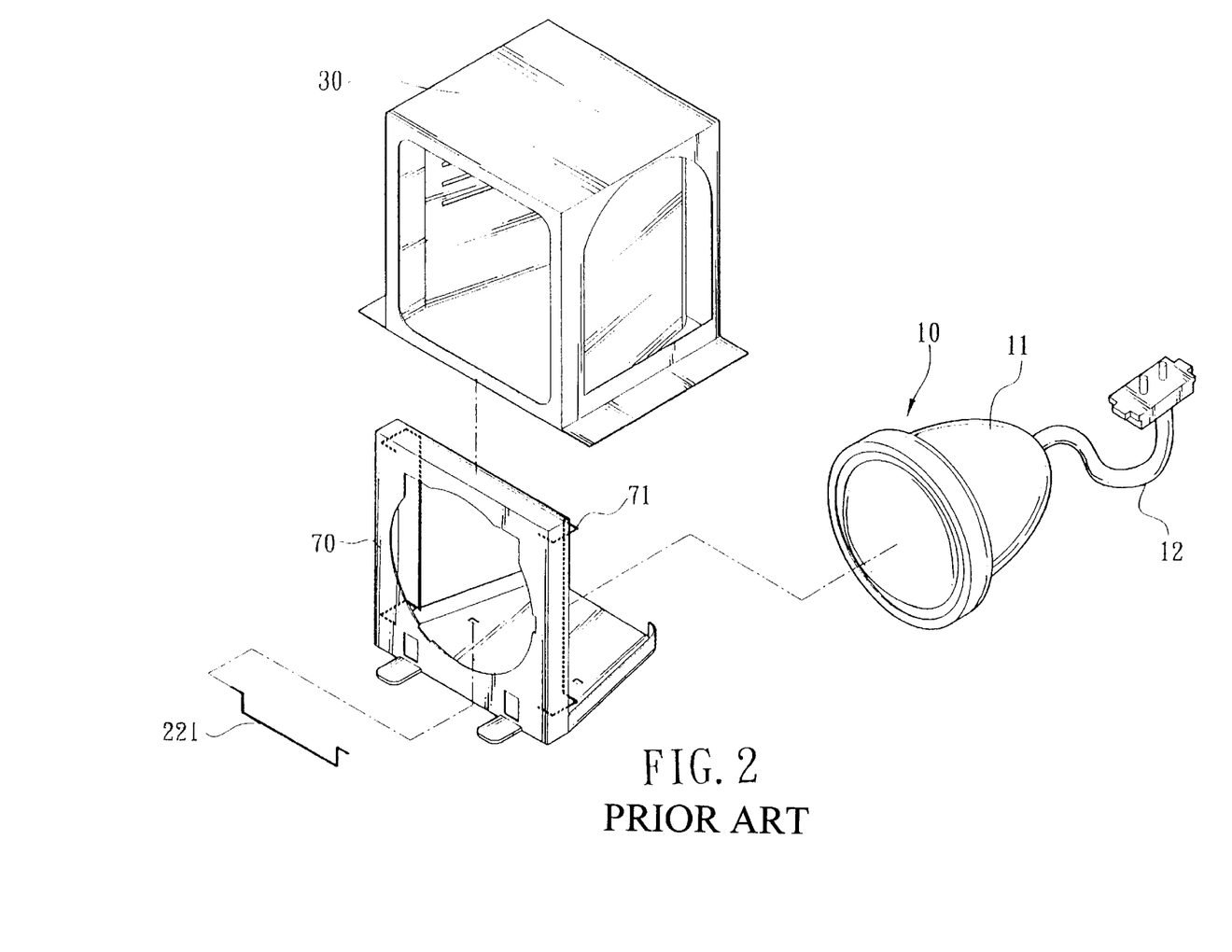
FIG. 2 is an exploded view of a conventional light source mounting apparatus for liquid crystal projector.
Figure 3:
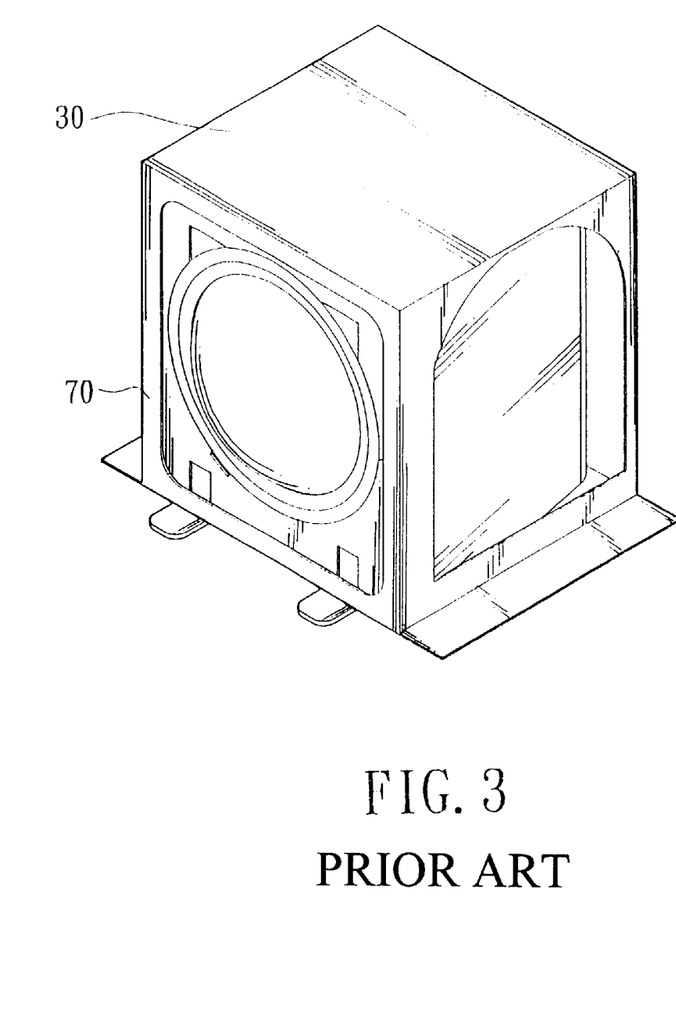
FIG. 3 is a perspective view of a conventional light source mounting apparatus for liquid crystal projector.

When there is a need to replace the lamp, the light generator 10 must be taken out or restored through a light source mounting apparatus (referring to FIGS. 2 and 3). For instance, the liquid crystal projector made by Epson Co. of Japan has a light source mounting apparatus which includes a steel wire 71 engaged with the outer side of the light generator 10 to couple the light generator 10 with a lamp frame 70. Then the lamp frame 70 and light generator 10 are mounted in a casing 30 to complete the assembly. For disassembly, the first step is to move a handle 231 to disengage the assembly of the lamp frame 70 and light generator 10 from the casing 30. Such a design has problems in use, notably:

1. When to mount the light generator 10 on the lamp frame 70, it takes a great force from the user to engage the steel wire 71 with the light generator 10. Of course, when to replace the light generator 10, the steel wire 71 also has to be removed. It gives user similar difficulty.

2. When to reassemble, such a structure is not able to guide the light generator 10 accurately returning to its original optical path before the disassembly.

As every assembly step will create a tolerance, the accumulated tolerance tends to produce a large deviation from the original optical path and will result in project color shift, non-uniformity and decreasing of light intensity.

3. When to replace the lamp, the handle 231 has to be pulled with a great force to remove the assembly of the lamp frame 70 and light generator 10 from the casing 30. Due to the tightly engagement of the power supply plug, the pulling of the handle 231 could easily deform the handle 231 and makes it detached from the lamp frame 70. From operation perspective, when the handle 231 is not use, it relies the deforming elastic force of the handle 231 to dispose it flatly at the bottom of the lamp frame, therefore will result in a complicated shape and takes more space. It is obviously that there are still rooms for improvement.

SUMMARY OF THE INVENTION

The primary object of this invention is to provide a light source mounting apparatus for liquid crystal projector that enables the light generator automatically positioning precisely when it is disassembled and reassembled again to ensure the projecting light returning to its original designed optical path.

The light source mounting apparatus according to this invention comprises a lamp base and a casing. The lamp base is a board including a holding unit. The casing provides a space for housing at least the lamp base, a front positioning plane and a strip spring located at the front positioning plane. When the whole structure has been disassembled and reassembled again, the holding unit forces the light generator located thereon automatically pressing against the front positioning plane for rapidly finishing the initial positioning, and the strip spring has a rear end to engage with the light generator tightly when the two elements are coupled together such that the light generator will press against the front positioning plane tightly to automatically finish positioning thereby to return the optical path in coincidence with the one prior to the disassembly.

The foregoing and additional objects, features and advantages of the present invention will be more readily apparent from the following detailed description, which proceeds with reference to the accompanying drawings.

DESCRIPTION OF THE PREFERRED EMBODIMENT

Figure 4:
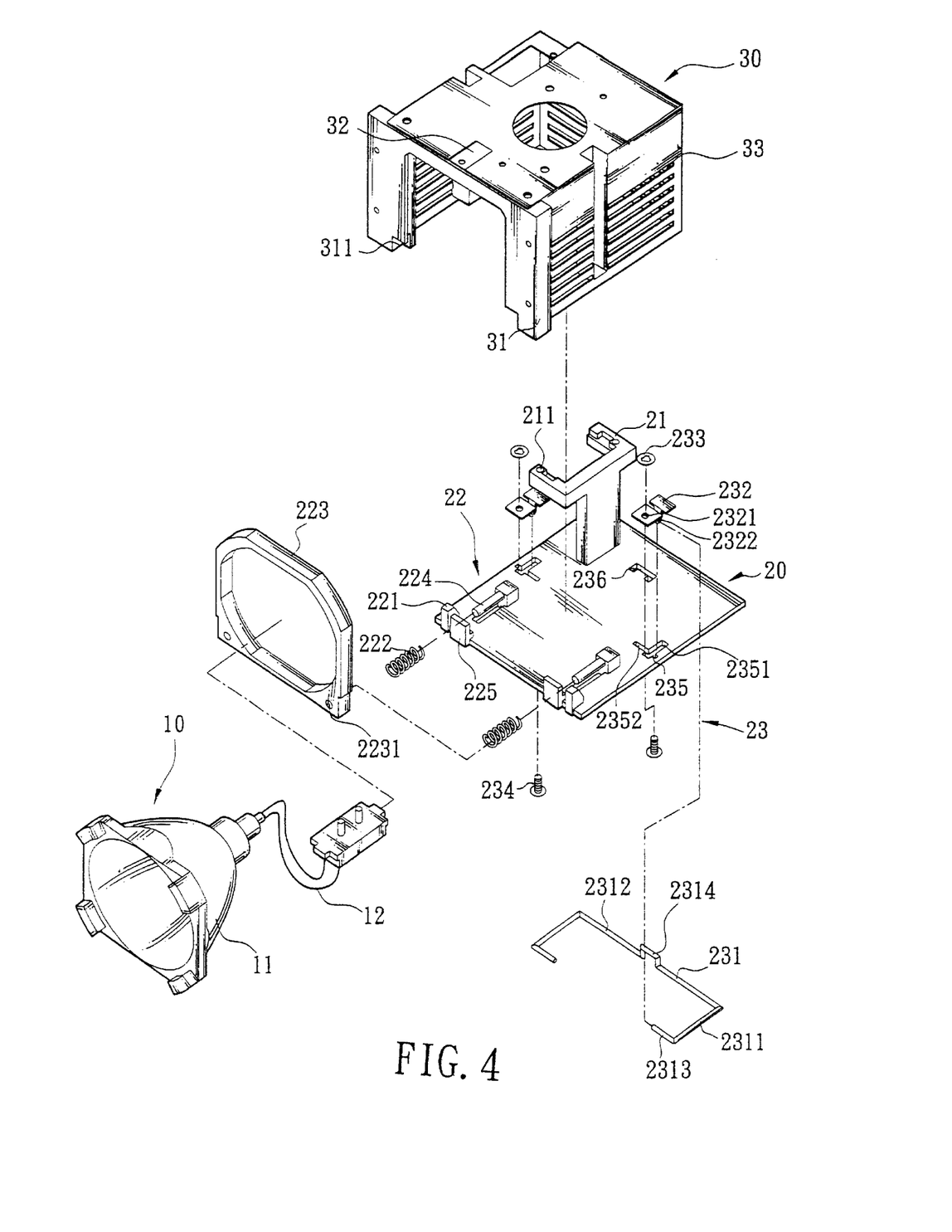
FIG. 4 is an exploded view of this invention.

Referring to FIG. 4, the light source mounting apparatus according to one embodiment of the present invention consists of a light generator 10, a lamp base 20 and a casing 30. When assembling, couple the light generator 10 and lamp base 20 to form a subassembly, then mount the subassembly in the casing 30.

The light generator 10 includes a lamp (not shown in the drawing), a reflector 11 and a power cord 12. The lamp emits light required for projection. The reflector 11 reflects light emitted from the lamp to become parallel light beam for projecting outwards. The power cord 12 connects to the lamp through the rear end of the reflector 11 and links to a power supply to provide electricity needed for the lamp.

The lamp base 20 is substantially a board type member for holding the light generator 10 and includes a power supply bracket 21, a holding unit 22 and a handle assembly 23. The bracket 21 and holding unit 22 are located respectively at two ends of one side of the lamp base 20, and the handle assembly 23 is located at another side of the lamp base 20.

The power supply bracket 21 has a screw bore 211 for fastening the plug of the power cord 12.

Figure 5:
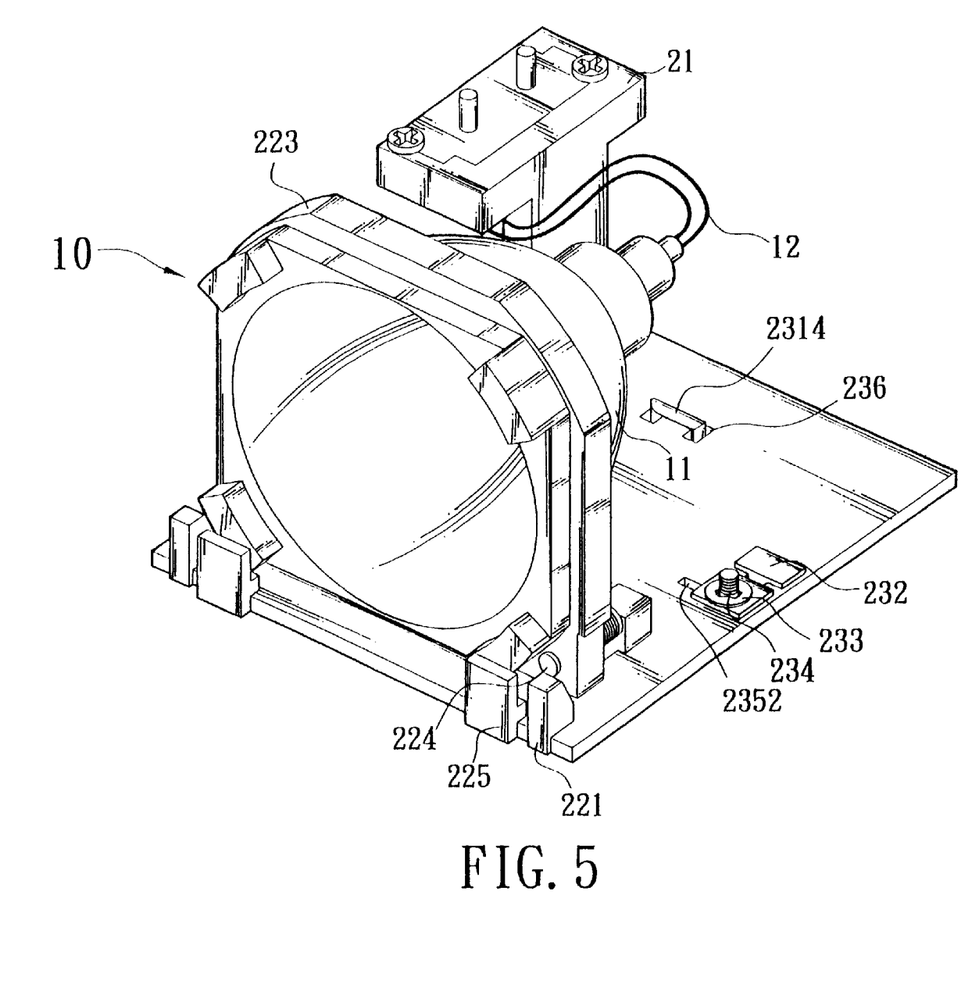
FIG. 5 is a perspective view of this invention, showing a lamp base coupled with a light generator.
Figure 6:
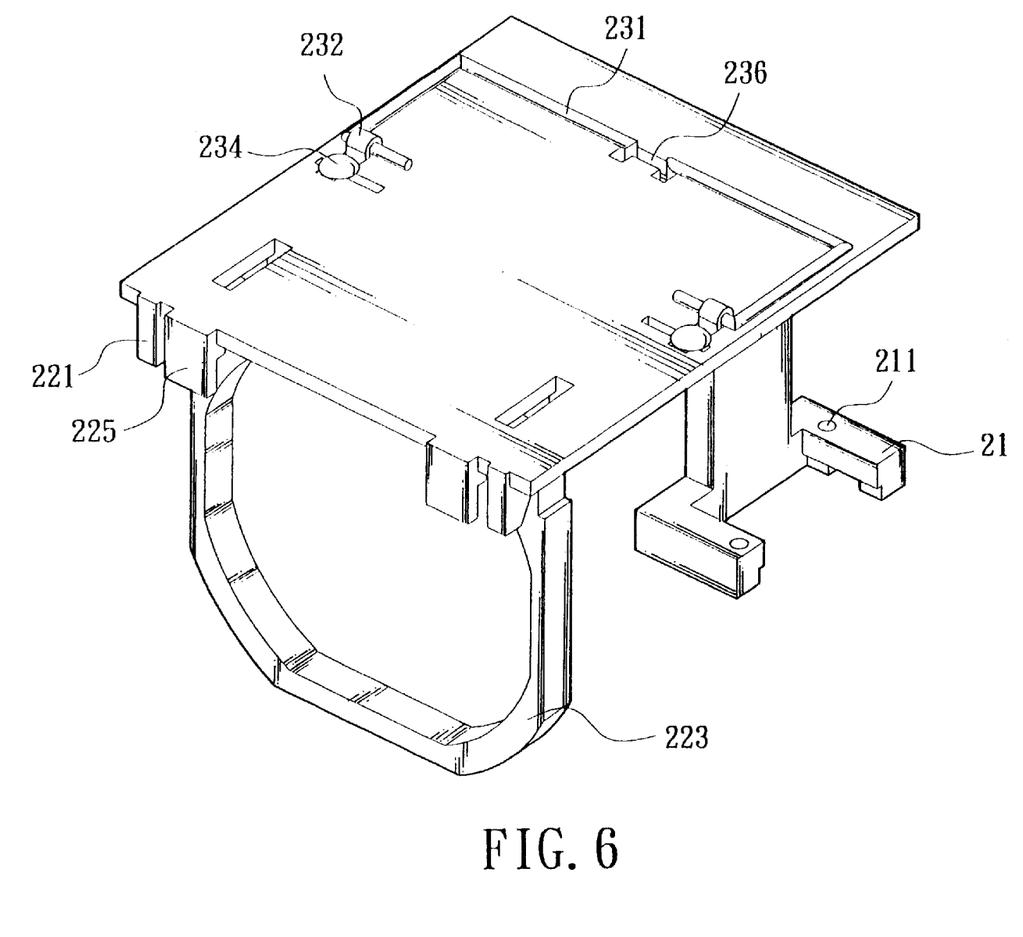
FIG. 6 is another perspective view of the lamp base of this invention.
Figure 7A:
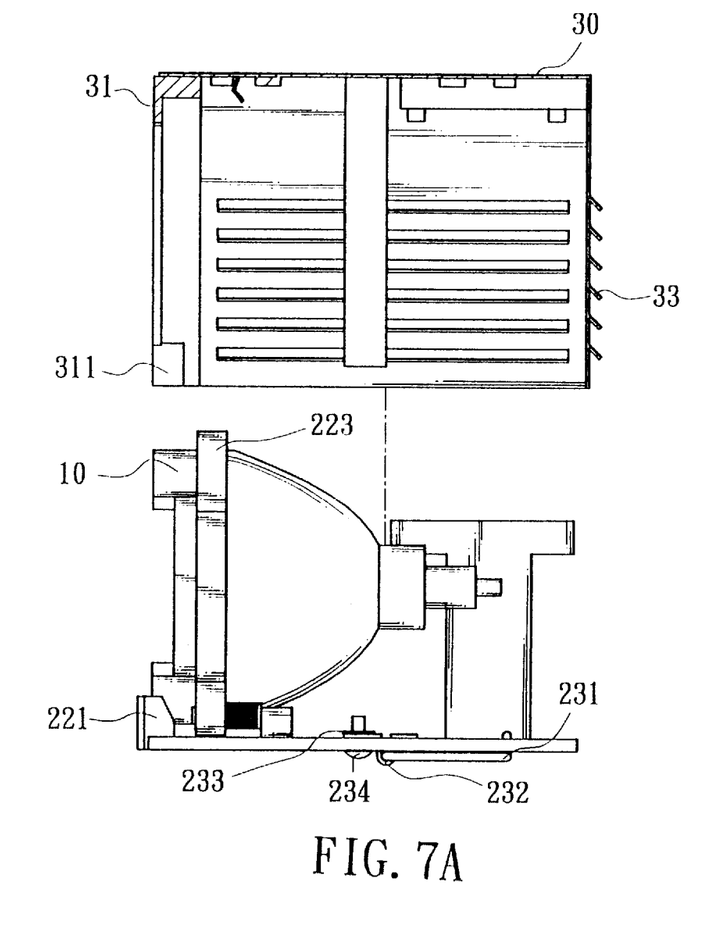
FIGS. 7A through 7D are schematic views of this invention, showing the lamp base coupling with the casing, and the relationship between the strip spring and the reflector.
Figure 7B:
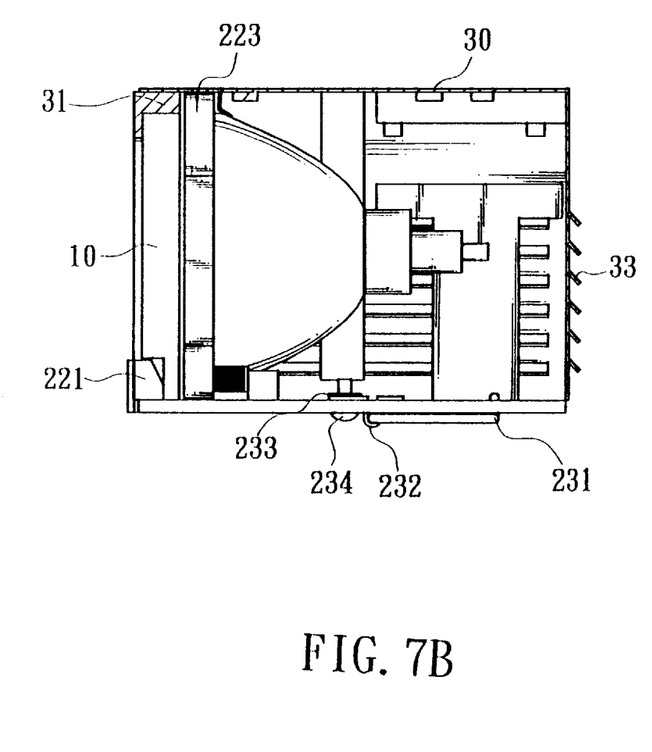
Figure 7C:
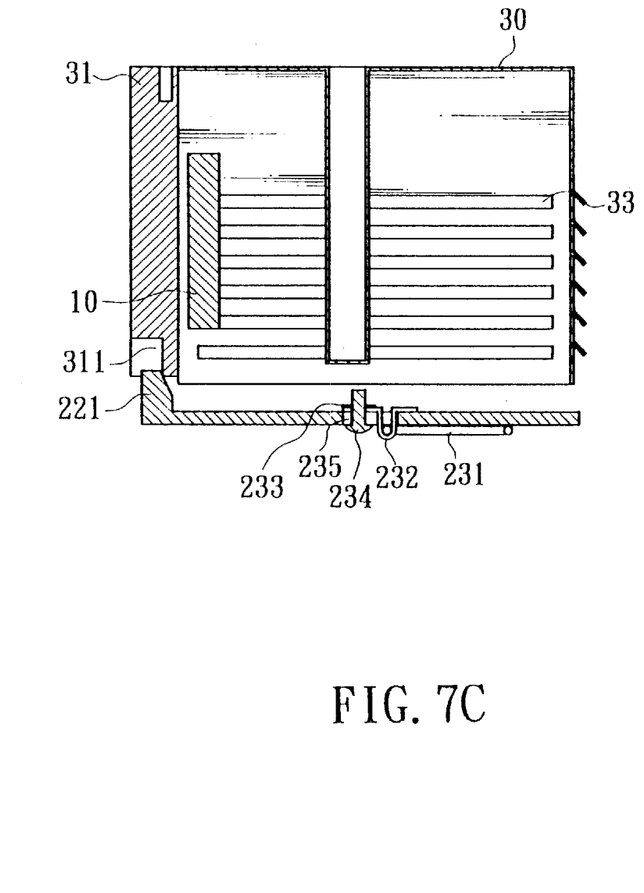
Figure 7D:
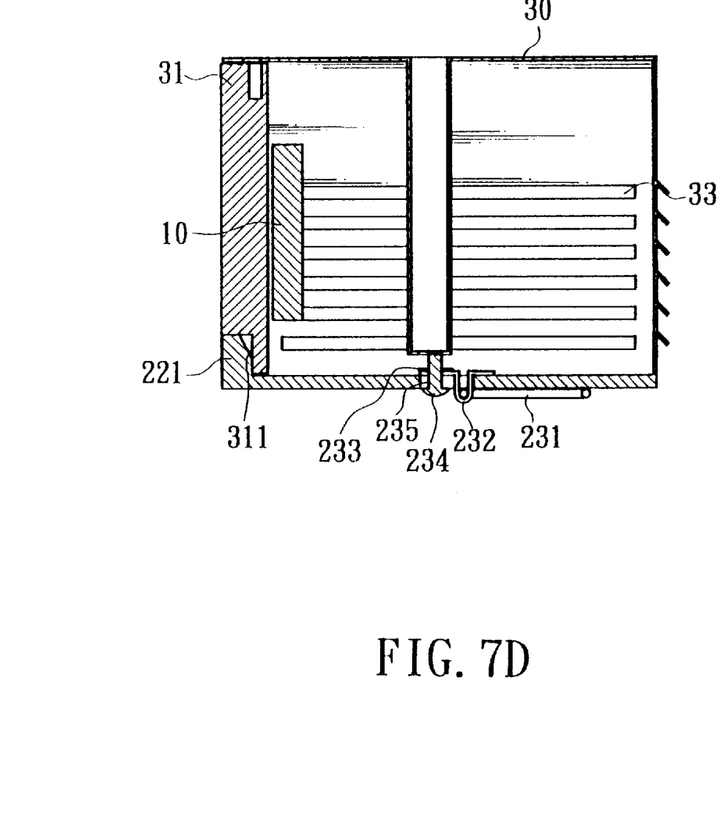

Referring to FIGS. 4, 5 and 6, the holding unit 22 is located at one end of the lamp base 20 opposite to the bracket 21, and includes a guiding block 221, a compression spring 222, a retaining ring 223, a slide rod 224 and an anchor block 225 for holding the reflector 11. The guiding block 221 is located at an edge of the lamp base 20 and has a chamfered edge facing another end of the lamp base 20.

The anchor block 225 is also located at the edge of the lamp base 20 and is opposite to the slide rod 224. The compression spring 222 (or a compressible elastic element or the like) surrounds the slide rod 224 and has two ends making contact respectively with the juncture of the slide rod 224 and lamp base 20 (i.e. at the root portion of the slide rod 224) and the retaining ring 223, and is restricted at two ends for storing or releasing power. The retaining ring 223 is substantially a frame having a center for the rear end of the reflector 11 to wedge therein. One side of the retaining ring 223 is a flat surface (the one contacts the anchor block 225, i.e. the side contacts the reflector 11 when the reflector 11 is fixedly mounted on the holding unit 22). There is a through bore 2231 located at the lower section of the retaining ring 223 mating against the slide rod 224 (at only one dimension) for limiting the movement of the retaining ring 223.

Referring to FIG. 5 for initial mounting of the light generator 10, press the retaining ring 223 against the compression spring 222 for storing power and move the power cord 12 through the center of the retaining ring 223; dispose the reflector 11 between the retaining ring 223 and anchor block 225; release the retaining ring 223 so that the retaining ring 223 will push the reflector 11 forwards to the anchor block 225 such that the flat surface of the retaining ring 223 contacted tightly against a flat surface of the light generator 10 (the reflector 11 is clamped by the anchor block 225 and retaining ring 223 because of the releasing power of the compressing spring 222, and is undergoing the positioning process) for holding the reflector 11 securely.

The plug of the power cord 12, after passing through the guiding block 221, may be disposed on the power supply bracket 21 and be fastened in the screw bore 211 by means of a screw; and use the edge of one end of the screw to limit the plug in the juncture of the bracket 21 to hold the plug securely on the bracket 21 (of course the bracket 21 is designed in compatible with the bottom end of the plug for aforesaid fastening).

Referring to FIGS. 4, 5, and 6, the handle assembly 23 includes a handle 231, a slide plate 232, a coupling element 233, a screw 234, a through hole 235 and an opening 236 for moving the lamp base 20 outwards from the casing 30. The handle 231 has two substantially vertical sections 2311 and a horizontal section 2312 bridged the two vertical sections 2311 at one end thereof. Another two ends of the vertical sections 2311 being bent vertically against the vertical section 2311 to form engaging ends 2313 pointing toward each other at the plane of the lamp base 20. The horizontal section 2312 forms a snap section 2314 formed thereon. The slide plate 232 is substantially made of a flat strip having a bulged section 2322 and an aperture 2321 at one end thereof. The coupling element 233 may be an E-type washer or a closed washer for clipping the screw thread of the screw 234. The through hole 235 is formed by a first groove 2351 and a second groove 2352 normal to each other (of course, they may be in the form of a "+" or "L" shape as shown in the drawings), and are located at the center portion of the lamp base 20 (in parallel respectively with the two vertical edges of the lamp base 20). The opening 236 has a form mating against the snap section 2314 for engaging with the same, and is located at another end of the lamp base 20. The through hole 235 and opening 236 are mating against the handle 231 for pulling and holding the handle 231.

To assemble the handle assembly 23, dispose the engaging ends 2313 through the second groove 2352 and align the bulged section 2322 with the first groove 2351 to place the slide plate 232 in the through hole 235, and dispose the engaging ends 2313 in the bulged section 2322, then fasten the screw 234 through the aperture 2321, and engage the coupling element 233 at the screw thread of the screw 234 adjacent the slide plate 232 to complete the handle assembly 23. When to store the handle 231, dispose the snap section 2314 in the opening 236 and push the handle 231 forwards, the snap section 2314 may be engaged to the lamp base 20, then fasten the screw 234 to the screw bore of the casing for storing the handle 231.

Referring to FIG. 4, the casing 30 and lamp base 20 form a housing space to contain at least the power supply bracket 21, holding unit 22 and handle assembly 23. The casing 30 has one side formed a front reference plane 31 and has a strip spring 32 for positioning the reflector 11 and preventing the reflector 11 from flipping backward. The front reference plane 31 is a frame which allows the optical path of the light generator 10 to pass through. The side edges of the frame form a surrounding area which is larger than the external size of the reflector 11, and has a flat inner surface to serve as the basis of vertical positioning for the reflector 11. It further has a recess 311 mating against the guiding block 221. The strip spring 32 has one end extended outwards and formed a "<" shaped pendant in the casing 30 and another end has a screw bore. The strip spring 32 is located above the front reference plane 31. When the casing 30 engage with the subassembly of the lamp base 20 and light generator 10, the extended end of the strip spring 32 contacts the retaining ring 223 thereby the reflector 11 will be restricted by the retaining ring 223, strip spring 32 and front reference plane 31 without moving (as the bottom of the retaining ring 223 is restricted by the compression spring 222, the strip spring 32 must be located at the upper side to limit the movement of the reflector 11). The apertures 33 are formed at selected locations of the casing 30 for dissipating heat generated by the light generator 10 when in use to avoid harmful impact on projection effect.

Figure 8:
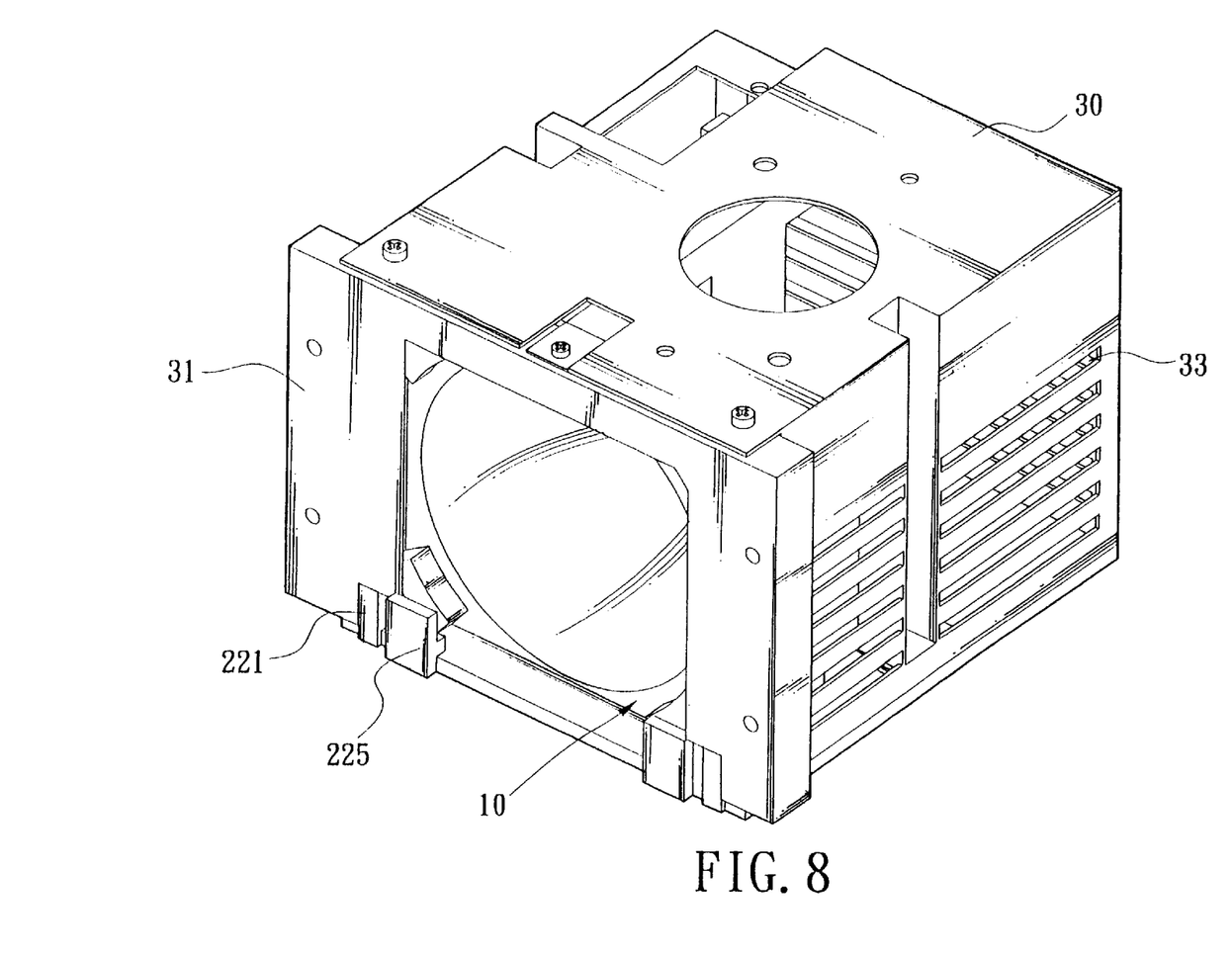
FIG. 8 is a perspective view of this invention.

Referring to FIGS. 7A through 7D, the light generator 10 is mounted on the lamp base 20 to reach an initial positioning, then the subassembly of the generator 10 and lamp base 20 is disposed in the casing 30. At this stage, one end of the front reference plane 31 can be automatically slid to a desired location for positioning through the chamfered edge of the guiding block 221 (as shown in FIG. 8), and the recess 311 will match with the guiding block 221, and the anchor block 225 will be moved away from one side of the reflector 11. Moreover, the strip spring 32 will engage the rear end of the reflector 11, and along with the retaining ring 223 to give the reflector 11 a positioning effect. When there is a need to change the lamp, the subassembly of the light generator 10 and lamp base 20 may be taken out from the casing 30 by moving the handle 231 from the opening 236 and pulling the handle 231 outwards. The construction of this invention set forth above may achieve the following effects:

1. The apparatus of this invention can reduce the accumulated tolerance resulting from combination of different parts and increase positioning accuracy thereby can prevent color shift, non-uniformity and decreasing of light intensity.

2. Disassembly of the parts is very simple and easy. Reassembling of the apparatus does not decrease repositioning accuracy, thus does not need repeated adjustment of the light generator position. The handle of this invention is securely built and will not be broken away when in use. It also takes a smaller space and is more convenient to use.

3. The components and construction of this invention do not demand very accurate tolerance, hence fabrication is simpler and costs less.

While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A light source mounting apparatus for liquid crystal projector, comprising:

a lamp base using a board member to form a holding unit and having at least one slide rod, at least one elastic element, an anchor block and a retaining ring, the elastic element being mounted on the slide rod and located between the retaining ring and the root of the slide rod, the retaining ring being a frame having a center portion for wedging a reflector of a light generator and an aperture at one end mating and engaging with the slide rod, the anchor block being located at an edge of the board for preventing the light generator and anchor block from being pushed away by the elastic element from the lamp base;

a casing having a frame-shaped front reference plane to contact a front end of the reflector for positioning the same and a strip spring located at the front reference plane, the strip spring having one end pendant and a rear end engaged with the reflector to keep the same to contact the front reference plane; and a handle assembly located at one end of the holding unit for the holding unit to be moved out from the casing.

2. The light source mounting apparatus of claim 1, wherein the lamp base further has a guiding block which has a chamfered edge for guiding the light generator to slide automatically for positioning.

3. The light source mounting apparatus of claim 1, wherein the elastic element provides a pushing force to make the retaining ring and reflector pressing against the front reference plane.

4. The light source mounting apparatus of claim 1, wherein the elastic element is a compression spring.

5. The light source mounting apparatus of claim 1, wherein the handle assembly includes a handle, a slide plate, a coupling element, a screw, a through hole and an opening; the handle having engaging ends and a snap section, the slide plate being a sheet having a bulged section in a middle portion for engaging with the engaging ends and an aperture at one end thereof for engaging with a screw, the coupling element being engaged with the screw for fastening the handle, the through hole having a first groove and a second groove communicating with each other, and the opening having a form mating against and engageable with the snap section.

6. The light source mounting apparatus of claim 5, wherein the coupling element is an E-type washer.

7. The light source mounting apparatus of claim 5, wherein the coupling element is a closed washer.

8. A light source mounting apparatus for liquid crystal projector, comprising:

a lamp base using a board member to form a holding unit and having at least one slide rod, at least one elastic element, an anchor block, a guiding block and a retaining ring, the elastic element being mounted on the slide rod and located between the retaining ring and the root of the slide rod, the retaining ring being a frame having a center portion for wedging a reflector of a light generator and an aperture at one end mating and engaging with the slide rod, the anchor block being located at an edge of the board for preventing the light generator and anchor block from being pushed away by the elastic element from the lamp base, said guiding block having a chamfer edge for guiding the light generator to slide automatically for positioning; and a casing having a frame-shaped front reference plane to contact a front end of the reflector for positioning the same and a strip spring located at the front reference plane, the strip spring having one end pendant and a rear end engaged with the reflector to keep the same to contact the front reference plane;

wherein the elastic element provides a pushing force to make the retaining ring and the reflector pressing against the front reference plane.

9. The light source mounting apparatus of claim 8, wherein the elastic element is a compression spring.

10. The light source mounting apparatus of claim 8 further having a handle assembly located at one end of the holding unit for the holding unit be moved out from the casing.

11. The light source mounting apparatus of claim 10, wherein the handle assembly includes a handle, a slide plate, a coupling element, a screw, a through hole and an opening; the handle having engaging ends and a snap section, the slide plate being a sheet having a bulged section in a middle portion for engaging with the engaging ends and an aperture at one end thereof for engaging with a screw, the coupling element being engaged with the screw for fastening the handle, the through hole having a first groove and a second groove communicating with each other, and the opening having a form mating against and engageable with the snap section.

12. The light source mounting apparatus of claim 11 wherein the coupling element is an E-type washer.

13. The light source mounting apparatus of claim 11 wherein the coupling element is a closed washer.

* * * * *